United States Patent [19]
Sunde et al.

[11] Patent Number: 5,919,739
[45] Date of Patent: Jul. 6, 1999

[54] PLUGGING LIQUID FOR PLUGGING A SUBTERRANEAN FORMATION ZONE

[75] Inventors: Egil Sunde, Sandnes; Hans Konrad Johnsen, Stjordal, both of Norway

[73] Assignee: Den norske stats oljeselskap a.s., Stavanger, Norway

[21] Appl. No.: 08/553,285

[22] PCT Filed: May 25, 1994

[86] PCT No.: PCT/NO94/00097

§ 371 Date: Jan. 22, 1996

§ 102(e) Date: Jan. 22, 1996

[87] PCT Pub. No.: WO94/28085

PCT Pub. Date: Dec. 8, 1994

[30] Foreign Application Priority Data

May 28, 1993 [NO] Norway .................................... 931954
Sep. 15, 1993 [NO] Norway .................................... 933288

[51] Int. Cl.$^6$ .............................. C09K 7/02; E21B 43/27
[52] U.S. Cl. ........................ 507/213; 507/110; 507/925; 507/903
[58] Field of Search ..................................... 507/213, 110, 507/925, 903

[56] References Cited

U.S. PATENT DOCUMENTS

| | | |
|---|---|---|
| 3,243,000 | 3/1966 | Patton et al. . |
| 3,741,894 | 6/1973 | Storfer ..................................... 507/110 |
| 3,804,760 | 4/1974 | Dorley ..................................... 507/240 |
| 3,979,303 | 9/1976 | Kang et al. . |
| 4,500,437 | 2/1985 | Engelhardt et al. ..................... 507/225 |
| 4,551,513 | 11/1985 | Engelhardt et al. .................. 526/307.1 |
| 4,571,422 | 2/1986 | Symes et al. . |
| 4,663,366 | 5/1987 | Drake et al. ............................. 523/130 |
| 4,683,953 | 8/1987 | Eustace et al. . |
| 5,211,859 | 5/1993 | Horton et al. ........................... 507/211 |
| 5,407,909 | 4/1995 | Goodhue, Jr. et al. .................. 507/118 |
| 5,663,123 | 9/1997 | Goodhue, Jr. et al. .................. 507/225 |
| 5,717,131 | 2/1998 | Sunde et al. ............................ 73/64.41 |

FOREIGN PATENT DOCUMENTS

| | | |
|---|---|---|
| 0 128 661A1 | 12/1984 | European Pat. Off. . |
| 0 137 538A2 | 4/1985 | European Pat. Off. . |
| 0 226 250A2 | 6/1987 | European Pat. Off. . |
| 1 406 513 | 9/1975 | United Kingdom . |
| 2 153 411 | 8/1985 | United Kingdom . |

OTHER PUBLICATIONS

EP 251638 (1988) As Abstracted By Dewent 88:001492.

*Primary Examiner*—C. H. Kelly
*Attorney, Agent, or Firm*—Kirkpatrick & Lockhart LLP

[57] ABSTRACT

A plugging liquid for plugging of a zone of a subterranean formation around a drill hole, consisting of an emulsion comprising (a) a continuous phase containing a hydrophobic liquid, an emulsifier and a crosslinking agent for a polysaccharide, and (b) a discontinuous phase containing water and a polysaccharide. A variant of the plugging composition contains in addition a weighting material in the discontinuous phase. Also described is a method for preparing the plugging liquid and a method for plugging a zone of a subterranean formation penetrated by a drill hole in fluid communication with the zone, according to which method the new plugging liquid is injected into the zone via the drill hole and is subjected to high shear forces in the drill hole, whereby the polysaccharide and the crosslinking agent are brought into contact with one another with resulting initiation of a crosslinking of the polysaccharide and the crosslinking agent and a setting of the plugging liquid. When the drilling liquid contains a weighting material it is primarily used to inhibit or prevent an undesired blow-out in or from a well.

44 Claims, No Drawings

PLUGGING LIQUID FOR PLUGGING A SUBTERRANEAN FORMATION ZONE

BACKGROUND OF THE INVENTION

1. Field of the Invention

This invention relates to a plugging liquid on emulsion basis, a method for its preparation and a method for plugging a zone of a subterranean formation penetrated by a drill hole.

2. Description of the Background of the Invention

A large number of gel forming compositions are known in the art for use as well control liquids in the drilling of wells for the recovery of oil and gas, for instance in cases where well liquids are lost to the formation or liquid or gas is flowing into the well from the formation. It is known to use polysaccharides for thickening purposes in such known gel forming compositions, see e.g. Norwegian Patents Nos. 116,667 and 161,625, U.S. Pat. No. 4,634,538 and British Patent No. 1,406,513.

It is also known to utilize as plugging liquids so-called "rheotropic" liquids. These liquids thicken when subjected to high shear stress. The rheotropic liquid must have physical characteristics enabling it to be easily pumped through the mud system (Condition 1) to the drill bit when leakages occur in the formation. The shear stress created when the liquid is forced through the nozzles of the drill bit, where the pressure drop will be in the range of about 50 to 120 bars, must result in a thickening of the liquid (Condition 2). The time before thickening must however be sufficient for the liquid to flow into and seal the formation.

U.S. Pat. No. 4,663,366 (Carr Corporation) discloses a rheotropic liquid of such a nature and an emulsion technique for controlling the thickening of the liquid. According to said patent, a polycarboxylic acid-containing water-in-oil emulsion is used wherein:

the oil phase contains dispersed therein a hydratable, water-swelling, hydrophilic clay such as bentonite, and additionally contains a solubilized surfactant consisting of a polyamine derivative, and the aqueous phase contains dissolved therein a polyacrylamide and a polycarboxylic acid.

It is critical that the bentonite be kept separated from the water until the required thickening of the liquid is initiated. For that purpose each droplet of the dispersed aqueous phase is coated with a membrane or a film of a polymeric material which is formed as a consequence of the aqueous phase being dispersed or emulsified in the oil phase of the emulsion. The film or membrane is formed as a result of the interfacial interaction between the polyamine derivative in the oil phase and the polyacrylamide and the polycarboxylic acid in the dispersed aqueous phase. When the emulsion is subjected to high shear forces, the protective film around the dispersed droplets in the emulsion is broken and the bentonite comes into contact with the water, thus enabling a swelling of the bentonite and consequently a thickening of the liquid. However, for the rheotropic liquid of U.S. Pat. No. 4,663,366 the obtainable ratio of the thickness of the liquid in Condition 2 to the thickness of the liquid in Condition 1 is lower than is desirable.

There is a need in well control operations for improved plugging liquids which (1) have the lowest possible viscosity in Condition 1, before they are subjected to high shear forces, (2) thickens to a high thickness in Condition 2 after having been subjected to high shear forces, (3) maintain their acquired thickness for a longer period of time, and (4) to the least possible extent undergo a thickening in Condition 1 as a result of the emulsion gradually deteriorating during storage or before it has had time to pass through the nozzles of the drill bit in the drill hole.

SUMMARY OF THE INVENTION

It is an object of the present invention to provide a plugging liquid exhibiting markedly improved properties compared to the plugging liquids that are available today.

Thus, the invention provides a new plugging liquid for plugging a zone of a subterranean formation around a drill hole, consisting of an aqueous liquid containing a polysaccharide. The plugging liquid is characterized in that it consists of an emulsion comprising:

a) 5–50% by volume of a continuous phase containing:
   800–998.5 ml/l of a hydrophobic liquid,
   0.5–100 ml/l of an emulsifier, and
   1–100 g/l of a crosslinking agent for a polysaccharide, b) 50–95% by volume of a discontinuous phase containing:
   950–997 ml/l of water, and
   3–50 g/l of a polysaccharide.

Like the emulsion of U.S. Pat. No. 4,663,366 discussed above, the new emulsion makes use of an emulsion technique involving storing of reactants separately, one in each phase of the emulsion. When the reactants utilized in the new emulsion, viz. the polysaccharide and the crosslinking agent, come into contact with one another after the emulsion having been subjected to high shear forces, a crosslinking of the polysaccharide is taking place, resulting in a setting of the emulsion to a gelatinous solid substance.

The principle of the setting of the new plugging liquid is different from that of the plugging liquid of U.S. Pat. No. 4,663,366. It is the crosslinking of the polysaccharide that causes the setting of the emulsion, whereas in the emulsion of U.S. Pat. No. 4,663,366 a thickening takes place as a result of a swelling of the bentonite when the latter comes into contact with water. The setting achieved with the new plugging liquid of the invention is a substantially irreversible setting and has a good durability within the periods of time that are of interest in normal rig operations.

DETAILED DESCRIPTION OF THE PREFERRED EMBODIMENTS

The mud system employed in well and formation treatment operations consists of a number of units, each of which exerts shear stress to a greater or lesser extent on the flowing liquid. The shear stress is closely related to the pressure drop in each individual unit. The highest pressure drop and thus the highest shear stress occurs e.g. during the passage of the nozzles in a drill bit or a port in a completion string down in a well. The use of the plugging liquid of the invention is based on the condition that only the nozzles of the drill bit or similar restrictions should produce a sufficiently high shear stress for the reactants (polysaccharide and crosslinking agent) to come into contact with one another, with a resulting crosslinking of the polysaccharide and setting of the liquid.

The hydrophobic liquid of the plugging liquid of the invention may advantageously be selected from mineral oils, vegetable oils, esters and ethers. It is selected on the basis of conventional criteria such as viscosity, stability, compatibility with the drilling mud, environmental considerations and availability.

The polysaccharide serving to achieve the desired hardness of the emulsion may for instance be selected from any of the polysaccharides previously utilized for well control. The currently, most preferred polysaccharides are xanthanes, alginates and scleroglucanes due to their combination of good crosslinking properties and viscosity characteristics.

Any of the commonly used crosslinking agents for polysaccharides may be used, especially such crosslinking agents that are stable at pH values in the range of 11 to 13. A preferred class of crosslinking agents is constituted by those containing divalent or trivalent metal ions as the active moiety. Examples of such crosslinking agents are $Ca(OH)_2$, $CaSO_4$ and $Al_2(SO_4)_3$. Another class of preferred crosslinking agents is constituted by aldehydes, such as glutaric aldehyde.

In addition to the above-mentioned main constituents the plugging liquid of the invention may contain a water-absorbing material in the continuous phase, i.e. the "oil" phase. As a water-absorbing material, a clay mineral would be preferred, in particular bentonite. By being incorporated in the "oil" phase, the water-absorbent material will be kept separated from the water contained in the aqueous phase, until the emulsion is broken by being subjected to high shear forces. The water-absorbent material will then come into contact with the water contained in the aqueous phase of the emulsion and will absorb excess amounts thereof, whereby said water-absorbent material will undergo swelling, as explained above in the discussion of the plugging liquid of U.S. Pat. No. 4,663,366. In the new plugging liquid, however, the primary function of the water-absorbent material is to absorb free water after the breaking of the emulsion and thus to prevent a shrinking of the material in Condition 2.

Preferably the plugging liquid of the invention comprises:
a) 20–40% by volume of a continuous phase containing:
  900–997 ml/l of a hydrophobic liquid,
  1–50 ml/l of an emulsifier, and
  2–50 g/l of a crosslinking agent for a polysaccharide,
b) 60–80% by volume of a discontinuous phase containing:
  970–995 ml/l of water, and
  5–30 g/l of a polysaccharide.

A particularly preferred plugging liquid of the invention consists of a water-in-oil emulsion constituted by:
a) about 25% by volume of an oil phase containing:
  about 968 ml/l of a low-aromatic lamp oil,
  about 12 ml/l of an emulsifier in a triglyceride base,
  about 16 g/l of bentonite, and
  about 24 g/l of calcium hydroxide,
b) about 75% by volume of an aqueous phase containing:
  about 992 ml/l of water and
  about 8 g/l of xanthane.

According to a variant of the invention, a plugging liquid of the above-described sort may contain a weighting material in addition to the constituents already mentioned, whereby the plugging liquid may be used for inhibiting or preventing undesired blow-outs in or from a well. The purpose of using a weighting material in the plugging liquid is to increase the density thereof so as to put the plugging liquid in a better condition to resist the blow-out pressure in the well.

A serious problem that may arise during the drilling of wells or in the production of oil and gas from wells is blow-out. Surface blow-outs occur when the drill bit cuts into a high pressure zone of gas, oil or water which can blow out the drilling mud and in serious cases even the drill stem with drill bit and other equipment and cause serious damage.

Underground blow-out occurs when a fluid in one porous formation flows into the well bore and then out of the well bore into another porous formation.

A common method of trying to stop blow-outs involves loading up the well with a slurry of weighting material, e.g. barite, under pressure and under conditions such that the barite is able to settle uniformly at the bottom of the well to form a hard plug, and then following up with a cement slurry in order to make the plug stronger and more permanent.

Another method consists in utilizing a slurry of a dry, powdered bentonite in diesel oil. When this slurry is mixed with the right amount of water, the bentonite will hydrate, yielding a stiff paste. If formed at the right time and at the right place, the mass may provide an effective plugging of the well, see for example U.S. Pat. No. 3,082,823.

U.S. Pat. No. 2,890,169 discloses plugging of a well with a plugging liquid prepared by forming first a slurry of an organophilic bentonite and cement in an oil, and then mixing the obtained slurry with a surfactant and water, to obtain a water-in-oil emulsion wherein the organophilic bentonite and the cement are dispersed in the continuous oil phase. As this emulsion is pumped down the well bore, the oil expands and flocculates the bentonite, which, under the right conditions, forms a filter cake on the well bore surface in the area to be plugged. This is then supposed to cause a filtration action which breaks the emulsion, whereby the emulsified water is brought into contact with the cement and reacts with the cement to form a solid coating on the filter cake, which completes the plugging.

When the above-described new plugging liquid is used, with any necessary minor adaptations, together with a weighting material, it has been found that a better plugging effect can be achieved than with the slurries and emulsions containing weighting material heretofore employed for plugging well bores.

Thus, the invention also provides a plugging liquid the form of an emulsion for well control, containing a weighting material, which plugging liquid is characterized by being constituted by an emulsion comprising:
a) 5–50% by volume of a continuous phase containing:
  800–998.5 ml/l of a hydrophobic liquid,
  0.5–100 ml/l of an emulsifier, and
  1–100 g/l of a crosslinking agent for a polysaccharide,
b) 50–95% by volume of a discontinuous phase containing:
  600–983 ml/l of water,
  3–50 g/l of a polysaccharide, and
  100–2500 g/l of a weighting material.

This variant of the new plugging liquid will be particularly useful in connection with underground blow-outs in those cases where it will be possible to pump the plugging liquid down the drill stem and through the drill bit. When the emulsion passes through the drill bit and consequently is subjected to high shear forces, a crosslinking of the polysaccharide is initiated by means of the crosslinking agent and the setting of the emulsion will make a substantial contribution to the well-killing effect achieved as a result of the high density of the emulsion.

Any weighting material can be used in the weighted plugging liquid of the invention. Exemplary weighting materials are barite, ilmenite, hematite, steel balls and calcium carbonate. A particularly suitable weighting material is barite.

The other constituents of the weighted plugging liquid of the invention, i.e. the hydrophobic liquid, the polysaccharide, the crosslinking agent for the polysaccharide, and the emulsifier, can be selected in the same manner as they are selected for the non-weighted plugging liquid of the invention, as described above.

When the plugging liquid of the invention is to be used for permanent closing of a well, the plugging liquid may also, if desired, contain an additive to prevent circulation loss, such as crushed nut shells or mica folium.

The weighted plugging liquid of the invention is preferably constituted by an emulsion comprising:
- a) 20–40% by volume of a continuous phase containing:
  - 900–997 ml/l of a hydrophobic liquid,
  - 1–50 ml/l of an emulsifier, and
  - 2–50 g/l of a crosslinking agent for a polysaccharide,
- b) 60–80% by volume of a discontinuous phase containing:
  - 620–850 ml/l of water,
  - 5–30 g/l of a polysaccharide, and
  - 1000–2500 g/l of a weighting material.

A particularly preferred weighted plugging liquid of the invention is constituted by a water-in-oil emulsion consisting of:
- a) about 25% by volume of an oil phase containing:
  - about 968 ml/l of a low-aromatic lamp oil,
  - about 12 ml/l of an emulsifier on a triglyceride basis,
  - about 16 g/l of bentonite, and
  - about 24 g/l of calcium hydroxide,
- b) about 75% by volume of an aqueous phase containing:
  - about 682 ml/l of water,
  - about 8 g/l of xanthane, and
  - about 1300 g/l of barite.

The invention also provides a method for preparing the new plugging liquid, which method is characterized by mixing the hydrophobic liquid, the emulsifier, the crosslinking agent and any optional water-absorbent material to a mixture (a), mixing the water and the polysaccharide to a mixture (b), and introducing mixture (b) gradually into mixture (a) under agitation to form an emulsion of water in the hydrophofic liquid. When the plugging liquid shall contain a weighting material, said weighting material is incorporated into mixture (b) together with the water and the polysaccharide.

For the purpose of obtaining a stable emulsion it is common practice to include a suitable emulsifier in the continuous phase. The emulsifier can be selected from a broad range of commercially available emulsifiers. The emulsifier should preferably have an alkali resistance such that it is stable in the pH range of 11 to 13 at typical drill hole temperatures. Emulsifiers on a triglyceride basis are very suitable for use in the plugging liquid of the invention. Based on conventional criteria which will be well known to those skilled in the art, such combinations of hydrophobic liquid and emulsifier are selected which will provide pH stability and the desired emulsion strength for handling and storing the emulsion, but which result in a breaking of the emulsion when the emulsion is pumped through the nozzles of a drill bit down in a drill hole.

The invention further provides a method for plugging a zone of a subterranean formation penetrated by a drill hole in fluid communication with said zone, in which method an aqueous plugging liquid containing a polysaccharide is injected into the zone via the drill hole, and is subjected to high shear forces in the drill hole, e.g. by passing through the nozzles of a drill bit. The method is characterized by there being used as plugging liquid an emulsion comprising:
- a) 5–50% by volume of a continuous phase containing:
  - 800–998.5 ml/l of a hydrophobic liquid,
  - 0.5–100 ml/l of an emulsifier, and
  - 1–100 g/l of a crosslinking agent for a polysaccharide,
- b) 50–95% by volume of a discontinuous phase containing:
  - 950–997 ml/l of water, and
  - 3–50 g/l of a polysaccharide, whereby, as a result of the emulsion being subjected to said high shear forces, the polysaccharide and the crosslinking agent are brought into contact with one another, with a resulting initiation of crosslinking of the polysaccharide and setting of the plugging liquid.

The weighted variant of the plugging liquid of the invention is used primarily to inhibit or prevent undesired blowouts in or from a well bore.

In Condition 1 the plugging liquid should be maintained under gentle agitation and at ambient temperature below 40° C. In preferred embodiments the plugging liquid contains no environmentally harmful or noxious constituents.

The plugging liquid of the invention is not affected by being pumped with a centrifugal pump or mud pump for several hours. However, when the emulsion is subjected to high shear forces, such as when it is forced through the nozzles of a drill bit at a pressure drop of 50 to 120 bars, e.g. about 100 bars, the emulsion sets markedly. The setting time for a non-weighted plugging liquid of the invention can be adjusted e.g. in the range of from 2 to 10 minutes, whereas the setting time for a weighted plugging liquid of the invention can be more appropriately adjusted to be within the range of from 2 seconds to 2 minutes, e.g. from 5 to 20 seconds.

The setting time can be predetermined through an appropriate selection of the amounts of crosslinking agent and emulsifier, especially the amount of emulsifier. An increased amount of emulsifier increases the setting time, whereas an increased amount of crosslinking agent reduces the setting time.

The preparation of the new plugging liquid and its characteristics are shown in more detail in the following examples.

EXAMPLE 1

Non-Weighted Plugginq Liquid

One liter of a water-in-oil emulsion was prepared in the following manner. 0.75 l of water and 4.0 g of xanthane were mixed under agitation in a 2 l cup (Cup 1), and likewise 0.25 l "EXXSOL D60", 3 ml "EMULSOGEN" (non-ionic fatty acid ester) and 5.0 g Ca(OH)$_2$ were mixed in another 2 l cup (Cup 2) under agitation. The mixture in Cup 1 was then added to the mixture in Cup 2 under agitation.

The obtained emulsion was pumped at a pressure of 60 bars through a nozzle and down into a cup where it set in the course of 5 minutes. After 24 hours the shearing stress was measured to be 6000 Pa.

During the setting of the emulsion, a certain amount of free water separated. This may be avoided by incorporating a water-absorbent material, such as bentonite, in the oil based mixture (Cup 2). This was made in Example 2.

EXAMPLE 2

Non-Weighted Plugging Liquid 150 l of a water-in-oil emulsion were prepared, consisting of:
- a) 25% by volume of an oil phase containing:
  - 968 ml/l oil of "EXXSOL D60",
  - 12 ml/l of "EMULSOGEN",
  - 16 g/l of bentonite,
  - 24 g/l of calcium hydroxide, b) about 75% by volume of an aqueous phase containing:
  992 ml/l of water and
  8 g/l of xanthane.

112 l of water and 900 g of xanthane in powdery form were mixed in a 2200 l vessel (Vessel 1) equipped with a propeller mixer operated at 400 r.p.m. 37 l of "EXXSOL D60" (a low-aromatic lamp oil), 300 ml "EMULSOGEN" (non-ionic fatty acid ester), 900 g of milled Ca(OH)$_2$ and 600 g of bentonite in powder form were mixed in a 1200 l vessel (Vessel 2) equipped with a propeller mixer operated at 400 r.p.m. The xanthane mixture in Vessel 1 was then gradually transferred at about 20° C. to Vessel 2 in 8 minutes under agitation at 400 r.p.m.

The obtained emulsion had a density of about 0.95 g/ml. It was not affected by being pumped with a centrifugal pump for 2 hours, during which period the temperature increased from 20 to 40° C. The test was repeated after 24 hours with the same result.

Circular pumping with a centrifugal pump, leading to an increase of the temperature to 62° C., resulted in the emulsion setting in the mixing vessel in Condition 1. However, the shear stress was not measurable, and thus was lower than 200 Pa. This suggests that the stability is reduced when the temperature of the emulsion increases from 40° C. to 60° C. in the emulsion. However, since the set emulsion still remained in Condition 1, it could again be agitated to form a liquid, homogenous state.

After having been subjected to a pressure drop of 100 bars through a needle valve the emulsion set markedly after 2 minutes. The following shearing stress values were measured at room temperature:

After 10 minutes: 8000 Pa
After 24 hours: 10–12.000 Pa
After 2 days (48 hours): 10–12.000 Pa.
No free water or oil was observed.

EXAMPLE 3
Weighted Plugging Liquid 1.362 liters of a water-in-oil emulsion were prepared in the following manner. 0.75 l of water and 6.0 g of xanthane were mixed under agitation in a 2 l cup (Cup 1). The mixture was allowed to rest for 1 hour, whereupon 1800 g of ilmenite were added to the mixture. In another 2 l cup (Cup 2) 0.25 liter of "EXXSOL D60", 1.0 ml "SAFEMUL PE" (an emulsifier in a triglyceride base) and 8.0 g of Ca(OH)$_2$ were mixed under agitation. The mixture in Cup 1 was then added to the mixture in Cup 2 under agitation. An emulsion having a density of 2.0 g/cm$^3$ was obtained.

The obtained emulsion was pumped at a pressure of 60 bars through a nozzle and into a cup where it set in the course of 1 minute. After 24 hours the shearing stress was measured to be 16000 Pa.

During the setting of the emulsion, a certain amount of free water separated. This may be avoided by incorporating a water-absorbent material, such as bentonite, in the oil based mixture (Cup 2).

EXAMPLE 4
Weighted Plugging Liquid 1.375 liters of a water-in-oil emulsion were prepared in the following manner. 0.75 l of water and 6.0 g of xanthane were mixed under agitation in a 2 l cup (Cup 1). The mixture was allowed to stand for 1 hour, whereupon 1500 g of barite were added to the mixture. In another 2 l cup (Cup 2) 0.25 liter of "EXXSOL D60", 1.0 ml "SAFEMUL PE" (an emulsifier in a triglyceride basis) and 8.0 g of Ca(OH)$_2$ were mixed under agitation. The mixture in Cup 1 was then added to the mixture in Cup 2 under agitation. An emulsion having a density of 1.80 g/cm$^3$ was obtained.

The obtained emulsion was pumped at a pressure of 60 bars through a nozzle and into a cup where it set in the course of 2 minutes. After 24 hours the shearing stress was measured to be 14000 Pa.

During the setting of the emulsion, a certain amount of free water separated out. This may be avoided by incorporating a water-absorbent material, such as bentonite, in the oil based mixture (Cup 2).

What is claimed is:

1. A plugging liquid for plugging a zone of a subterranean formation around a drill hole comprising:
   a) 5–50% by volume of a continuous phase containing:
      800–998.5 ml/l of a hydrophobic liquid,
      0.5–100 ml/l of an emulsifier, and
      1–100 g/l of a crosslinking agent for a polysaccharide
   b) 50–95% by volume of a discontinuous phase containing:
      950–997 ml/l of water, and
      3–50 g/l of a polysaccharide
   wherein said polysaccharide is selected from the group consisting of xanthanes, alginates and scleroglucanes, and said crosslinking agents are selected from the group consisting of calcium hydroxide, calcium sulfate, aldehyde and aluminum sulfate.

2. The plugging liquid according to claim 1 comprising:
   a) 20–40% by volume of a continuous phase containing:
      900–997 ml/l of a hydrophobic liquid,
      1–50 ml/l of an emulsifier, and
      2–50 g/l of a crosslinking agent for a polysaccharide,
   b) 60–80% by volume of a discontinuous phase containing:
      970–995 ml/l of water, and
      5–30 g/l of a polysaccharide.

3. The plugging liquid according to claim 1 wherein the hydrophobic liquid is selected from the group consisting of mineral oils, esters and ethers.

4. The plugging liquid according to claim 1 wherein the crosslinking agent for crosslinking the polysaccharide contains divalent or trivalent metal ions as the active moiety.

5. The plugging liquid according to claim 1 wherein the crosslinking agent is an aldehyde.

6. The plugging liquid according to claim 1 wherein the hydrophobic liquid contains a water-absorbing material.

7. The plugging liquid according to claim 6 wherein the water-absorbing material is a bentonite.

8. The plugging liquid according to claim 1 wherein the emulsifier has an alkali resistance such that it is stable at pH 11 to 13.

9. The plugging liquid according to claim 8 wherein the emulsifier is a triglyceride.

10. The plugging liquid according to claim 1 wherein the plugging liquid is a water-in-oil emulsion consisting of:
    a) about 25% by volume of an oil phase containing:
       about 968 ml/l of a low-aromatic lamp oil,
       about 12 ml/l of a triglyceride emulsifier,
       about 16 g/l of bentonite, and
       about 24 g/l of calcium hydroxide,
    b) about 75% by volume of an aqueous phase containing:
       about 992 ml/l of water and
       about 8 g/l of xanthane.

11. A plugging liquid for well control in the form of an emulsion comprising:
    a) 5–50% by volume of a continuous phase containing:
       800–998.5 ml/l of a hydrophobic liquid,
       0.5–100 m/l of an emulsifier, and
       1–100 g/l of a crosslinking agent for a polysaccharide, b) 50–95% by volume of a discontinuous phase containing:
  600–983 ml/l of water,
  3–50 g/l of a polysaccharide, and
  100–2500 g/l of a weighting material
wherein said polysaccharide is selected from the group consisting of xanthanes, alginates and scleroglucanes, and said crosslinking agents are selected from the group consisting of calcium hydroxide, calcium sulfate, aldehydes and aluminum sulfate and said weighting material is selected from the group consisting of baritie, ileminite, hematite, steel balls and calcium carbonate.

12. The plugging liquid according to claim 11 comprising:
  a) 20–40% by volume of a continuous phase containing:
    900–997 ml/l of a hydrophobic liquid,
    1–50 ml/l of an emulsifier, and
    2–50 g/l of a crosslinking agent for a polysaccharide,
  b) 60–80% by volume of a discontinuous phase containing:
    650–850 ml/l of water,
    5–30 g/l of a polysaccharide, and
    1000–2500 g/l of a weighting material.

13. The plugging liquid according to claim 11 wherein the hydrophobic liquid is selected from the group consisting of mineral oils, esters and ethers.

14. The plugging liquid according to claim 11 wherein the crosslinking agent for crosslinking the polysaccharide contains divalent or trivalent metal ions moiety.

15. The plugging liquid according to claim 11 wherein the crosslinking agent is an aldehyde.

16. The plugging liquid according to claim 11 wherein the emulsifier is a triglyceride.

17. The plugging liquid according to claim 11 wherein the hydrophobic liquid contains a water-absorbing material.

18. The plugging liquid according to claim 17 wherein the water-absorbing material is bentonite.

19. The plugging liquid according to claim 11 wherein the weighting material is selected from the group consisting of barite, ilmenite, hematite, steel balls and calcium carbonate.

20. The plugging liquid according to claim 19 wherein the weighting material is barite.

21. The plugging liquid according to claim 11 wherein the plugging liquid is a water-in-oil emulsion consisting of:
  a) about 25% by volume of an oil phase containing:
    about 968 ml/l of a low-aromatic lamp oil,
    about 12 ml/l of a triglyceride emulsifier,
    about 16 g/l of bentonite, and
    about 24 g/l of calcium hydroxide,
  b) about 75% by volume of an aqueous phase containing:
    about 682 ml/l of water,
    about 8 g/l of xanthane, and
    about 1300 g/l of barite.

22. The plugging liquid according to claim 11 wherein the emulsifier has an alkali resistance such that it is stable at pH 11 to 13.

23. A method for preparing a plugging liquid made of an emulsion comprising:
  a 5–50% by volume of a continuous phase containing:
    800–998.5 ml/l of a hydrophobic liquid optionally containing a water-absorbing material,
    0.5–100 ml/l of an emulsifier, and
    1–100 g/l of a crosslinking agent for a polysaccharide,
  b) 50–95% by volume of a discontinuous phase containing:
    600–983 ml/l of water,
    3–50 g/l of a polysaccharide, and
    100–2500 g/l of a weighting material, the method comprising the steps of mixing the hydrophobic liquid, the emulsifier, the crosslinking agent and optional water-absorbent material to form a mixture (a), mixing the water, the polysaccharide and the weighting material to form a mixture (b), and introducing mixture (b) gradually into mixture (a) under agitation to form an emulsion of water in the hydrophobic liquid.

24. A method of plugging a zone of a subterranean formation penetrated by a drill hole in a fluid communication with said zone, in which a plugging liquid is injected into said zone via the drill hole by passing the plugging liquid through nozzles of a drill bit, the plugging liquid being comprised of:
  a) 5–50% by volume of a continuous phase containing:
    800–998.5 ml/l of a hydrophobic liquid,
    0.5–100 ml/l of an emulsifier, and
    1–100 g/l of a crosslinking agent for a polysaccharide
  b) 50–95% by volume of a discontinuous phase containing:
    950–997 ml/l of water, and
    3–50 g/l of a polysaccharide
wherein said polysaccharide is selected from the group consisting of xanthanes, alginates and scleroglucanes, and said crosslinking agents are selected from the group consisting of calcium hydroxide, calcium sulfate, aldehydes and aluminum sulfate.

25. The method according to claim 24 wherein the emulsion comprises:
  a) 20–40% by volume of a continuous phase containing:
    900–997 ml/l of a hydrophobic liquid,
    1–50 ml/l of an emulsifier, and
    2–50 g/l of a crosslinking agent for a polysaccharide,
  b) 60–80% by volume of a discontinuous phase containing:
    970–995 ml/l of water, and
    5–30 g/l of a polysaccharide.

26. The method according to claim 24 wherein the hydrophobic liquid is selected from the group consisting of mineral oils, esters and ethers.

27. The method according to claim 24 wherein the crosslinking agent for crosslinking the polysaccharide contains divalent or trivalent metal ions as the active moiety.

28. The method according to claim 24 wherein the crosslinking agent is an aldehyde.

29. The method according to claim 24 wherein the hydrophobic liquid contains a water-absorbing material.

30. The method according to claim 29 wherein the water-absorbing material is bentonite.

31. The method according to claim 24 wherein the emulsifier has an alkali resistance such that it is stable at pH 11 to 13.

32. The method according to claim 31 wherein the emulsifier is a triglyceride.

33. The method according to claim 24 wherein the plugging liquid is a water-in-oil emulsion consisting of:
  a) about 25% by volume of an oil phase containing:
    about 968 ml/l of a low-aromatic lamp oil,
    about 12 ml/l of a triglyceride emulsifier,
    about 16 g/l of bentonite, and
    about 24 g/l of calcium hydroxide,
  b) about 75% by volume of an aqueous phase containing:
    about 992 ml/l of water and
    about 8 g/l of xanthane.

34. A method for inhibiting an undesired blow-out in or from a well comprised of using a plugging liquid made of an emulsion comprising:

a) 5–50% by volume of a continuous phase containing:
  800–998.5 ml/l of a hydrophobic liquid optionally containing a water-absorbing material,
  0.5–100 ml/l of an emulsifier, and
  1–100 g/l of a crosslinking agent for a polysaccharide,
b) 50–95% by volume of a discontinuous phase containing:
  600–983 ml/l of water,
  3–50 g/l of a polysaccharide, and
  100–2500 g/l of a weighting material to plug a zone of a subterranean formation penetrated by a drill hole in fluid communication with said zone, in which the plugging liquid is injected into said zone via the drill hole wherein said polysaccharide is selected from the group consisting of xanthanes, alginates and scleroglucanes, and said crosslinking agents are selected from the group consisting of calcium hydroxide, calcium sulfate, aldehyde and aluminum sulfate and said weighting material is selected from the group consisting of baritie, ileminite, hematite, steel balls and calcium carbonate.

35. The method according to claim 34 wherein the emulsion comprises:
  a) 20–40% by volume of a continuous phase containing:
    900–997 ml/l of a hydrophobic liquid,
    1–50 ml/l of an emulsifier, and
    2–50 g/l of a crosslinking agent for a polysaccharide,
  b) 60–80% by volume of a discontinuous phase containing:
    650–850 ml/l of water,
    5–30 g/l of a polysaccharide, and
    1000–2500 g/l of a weighting material.

36. The method according to claim 34 wherein the hydrophobic liquid is selected from the group consisting of mineral oils, esters and ethers.

37. The method according to claim 34 wherein the crosslinking agent for crosslinking the polysaccharide contains divalent or trivalent metal ions as the active moiety.

38. The method according to claim 34 wherein the crosslinking agent is an aldehyde.

39. The method according to claim 34 wherein the emulsifier is a triglyceride.

40. The method according to claim 34 wherein the hydrophobic liquid contains a water-absorbing material.

41. The method according to claim 40 wherein the water-absorbing material is bentonite.

42. The method according to claim 34 wherein the weighting material is barite.

43. The method according to claim 34 wherein the plugging liquid is a water-in-oil emulsion consisting of:
  a) about 25% by volume of an oil phase containing:
    about 968 ml/l of a low-aromatic lamp oil,
    about 12 ml/l of a triglyceride emulsifier,
    about 16 g/l of bentonite, and
    about 24 g/l of calcium hydroxide,
  b) about 75% by volume of an aqueous phase containing:
    about 682 ml/l of water,
    about 8 g/l of xanthane, and
    about 1300 g/l of barite.

44. The method according to claim 34 wherein the emulsifier has an alkali resistance such that it is stable at pH 11 to 13.

* * * * *

UNITED STATES PATENT AND TRADEMARK OFFICE
CERTIFICATE OF CORRECTION

PATENT NO. : 5,919,739  
DATED : July 6, 1999  
INVENTOR(S) : Sunde et al.

Page 1 of 1

It is certified that error appears in the above-identified patent and that said Letters Patent is hereby corrected as shown below:

Column 9,
Line 28, before "moiety" insert -- as the active --;

Column 10,
Line 11, delete the second occurrence of "a";
Line 13, delete "via" and substitue therfor -- and is subjected to high shear forces -in --
Line 27, delete "." and subsitute therefor -- whereby, as a result of the plugging liquid being subject to said high shear forces, the polysaccharide and the crosslinking agent of said emulsion are brought into contact with one another, with a resulting initiation of crosslinking of the polysaccharide and setting of the plugging liquid.-- .

Signed and Sealed this

Sixteenth Day of October, 2001

Attest:

*Attesting Officer*

NICHOLAS P. GODICI  
*Acting Director of the United States Patent and Trademark Office*